United States Patent [19]

Bomans et al.

[11] Patent Number: 5,444,837
[45] Date of Patent: Aug. 22, 1995

[54] METHOD FOR STRUCTURING INFORMATION USED IN AN INDUSTRIAL PROCESS AND ITS APPLICATION TO AIRCRAFT PILOTING ASSISTANCE

[75] Inventors: Muriel Bomans, Boulogne; Francine Pierre, Paris; Hugues Robin, Bouguenais, all of France

[73] Assignee: Sextant Avionique, Meudon la Foret, France

[21] Appl. No.: 174,818

[22] Filed: Dec. 29, 1993

[30] Foreign Application Priority Data

Jan. 12, 1993 [FR] France ................... 93 00377

[51] Int. Cl.⁶ ............................................. G06T 9/00
[52] U.S. Cl. ................................. 395/140; 395/155; 395/160; 395/161
[58] Field of Search ............. 395/119, 120, 133–139, 395/140, 155, 160, 161, 575, 600, 800; 364/DIG. 2, 300, 551.01, 552

[56] References Cited

U.S. PATENT DOCUMENTS

| | | | |
|---|---|---|---|
| 4,736,320 | 5/1988 | Bristol | 364/300 |
| 4,953,106 | 8/1990 | Sansner et al. | 364/DIG. 2 |
| 5,193,178 | 3/1993 | Chillarege et al. | 395/575 |
| 5,201,046 | 4/1993 | Goldberg et al. | 395/600 |
| 5,237,518 | 8/1993 | Sztipanovits et al. | 364/551.01 |
| 5,239,487 | 8/1993 | Horejsi et al. | 364/552 |
| 5,247,693 | 7/1993 | Bristol | 395/800 |
| 5,265,035 | 11/1993 | Riefman et al. | 364/551.01 |

OTHER PUBLICATIONS

Brown, G. et al. "Program Visualization: Graphical Support for Software Development." Computer. Vol. 18, No. 8 (Long Beach, Calif., Aug. 1985). Pp. 27–35.

Jochem, R. et al. "An Object Oriented Analysis and Design Methodology for Computer Integrated Manufacturing Systems." Tools '89: Technology of Object-Oriented Languages and Systems Proceedings. Nov. 13, 1989. (Paris, France). Pp. 76–84.

Ambler, A. et al. "Influence of Visual Technology on the Evolution of Language Environments." Computer. Vol. 22, No. 10. (Long Beach, Calif., Oct. 1989). Pp. 9–22.

*Primary Examiner*—Almis R. Jankus
*Attorney, Agent, or Firm*—Browdy and Neimark

[57] ABSTRACT

A method which uses a terminal comprising a processor, a screen and a keyboard, comprises step by step breakdown of all the information ("checklist") to be structured into subsets and identification of their structure, grouping together by similar structures of the subsets into objects ("blocClist", "tiCL", "tiblocCL", "remark", "item", "Sdeb", "verif", "Sfin"), input into the terminal of each object, in the form of a graphical symbol representing a node, and of the characteristics thereof, input into the terminal of link type symbols connecting two objects indicating a hierarchical include relation between two objects, translation by the terminal of the graph thus derived into a structure model expressed in a computer language and monitoring of the consistency thereof. The method applies notably to the management, by an on-board computer in an aircraft, of the lists of tasks to be performed during the phases of piloting.

15 Claims, 12 Drawing Sheets

```
<!DOCTYPE Normal Procedures Checklist >

<!ELEMENT checklist - - (tiCL , blocClist+) >
<!ELEMENT tiCL - - (#PCDATA) >
<!ELEMENT blocClist - - (tiblocCL , remark* , (blocClist* & item*)) >
<!ELEMENT tiblocCL - - (#PCDATA) >
<!ELEMENT remark - - (#PCDATA) >
<!ELEMENT item - - (Sdeb? , verif , Sfin? , remark*) >
<!ELEMENT verif - - (#PCDATA) >
<!ELEMENT Sdeb - - (#PCDATA) >
<!ELEMENT Sfin - - (#PCDATA) >
```

```
<checklist><tiCL>B-727 / NORMAL PROCEDURES CHECKLIST </tiCL>
<blocClist><tiblocCL> AFTER TAKEOFF - CLIMB </tiblocCL>
<item><Sdeb>*</Sdeb><verif> LANDING GEAR.......................OFF</verif>
<Sfin>#</Sfin></item>
<item><verif>HIGH INTENSITY LIGHTS......................ON</verif></item>
<item><Sdeb>*</Sdeb><verif>FLAPS..................................UP</verif>
<Sfin>#</Sfin></item><blocClist><tiblocCL> After cleaning of the plane </tiblocCL>
<item><verif>ENGINE IGNITION ....................IF NECESSARY</verif></item>
<item><verif>FUEL CHECK.........................SI NECESSARY</verif></item>
<item><verif>PRESSURIZATION ...................ACTIVE & CHECKED</verif></item>
<item><verif>HYDRAULIC PUMPS.....................IF NECESSARY</verif></item>
</blocClist><blocClist><tiblocCL> 10 000 Ft. MSL</tiblocCL>
<item><verif>ALTIMETRES .............................VERIFIES</verif></item>
</blocClist><blocClist><tiblocCL> 18 000 Ft. MSL</tiblocCL>
<item><verif>ALTI. AND BARO...........................CHECKED</verif>
<remark>(outside the american continent, set to the specified transitional altitude obtained
from ATC)</remark></item>
<item><verif>RADIO ALTIMETERS............................OFF</verif></item>
<item><Sdeb>*</Sdeb><verif>LANDING LIGHTS.......................OFF</verif></item>
<item><verif>TPS.................................IF NECESSARY</verif></item>
<item><verif>AIR COND. CHECK.........................CHECKED</verif></item>
<item><verif>PRESSURIZATION .........................CHECKED</verif></item>
</blocClist><blocClist><tiblocCL> Climb above 300 FL</tiblocCL><item>
<verif>PRESSURIZATION........................PURGED</verif></item></blocClist>
</blocClist><blocClist><tiblocCL> CRUISE FLIGHT </tiblocCL>
<item><verif>ENGINE CHECK........................IF NECESSARY</verif></item>
<item><verif>POINTS OF 1st FLIGHT OF THE DAY .........CHECKED</verif></item>
<item><verif>DELAY CODES.........................IF NECESSARY</verif></item>
</blocClist><blocClist><tiblocCL> DESCENT </tiblocCL>
<item><verif>PRESSURIZATION ........................CHECKED</verif></item>
<item><verif>LANDING DATA ..........................PREPARED</verif></item>
<blocClist><tiblocCL> Descent below 180 FL or exit from cruising altitude which is lower
</tiblocCL><item><verif>ALTI. AND BARO........CHECKED</verif><remark>(outside the
american continent, zeroize upon starting descent to an altitude lower than the transitional
level)</remark></item>
<item><verif>RADIO ALTIMETERS.....................ON/TESTED</verif></item>
<item><verif>LANDING LIGHTS............................ON</verif></item>
<item><verif>ASPIRATION VANE.....................IF NECESSARY</verif></item>
<item><verif>COOLING GATES.............................OPEN</verif>
<remark>descent below 10 000 FT MSL or exit cruising altitude which is lower </remark>-
</item><item><verif>HYDRAULIC PUMPS..........................ON</verif>
<Sfin>#</Sfin></item></blocClist></blocClist><blocClist><tiblocCL> BEFORE LANDING
</tiblocCL><remark>Use Mechanical checklist </remark></blocClist><blocClist>-
<tiblocCL> AFTER LANDING - TAXI </tiblocCL>
<item><verif>ANTI-SKID ..............................OFF</verif></item>
<item><verif>BRAKES................................FRONT</verif></item>
<item><verif>BRAKE PRESSURE .....................CHECKED</verif></item>
<item><verif>....</blocClist>....</checklist>
```

B-727 / NORMAL PROCEDURES CHECKLIST

AFTER TAKEOFF - CLIMB

```
* LANDING GEAR.................................................... OFF #  18 000 Ft. MSL
  HIGH INTENSITY LIGHTS........................................ ON      ALTI. AND BARO................................ CHECKED
* FLAPS............................................................... UP #    (outside the american continent, set to the specified
                                                                                 transitional altitude obtained from ATC)
  After cleaning of the plane                                            RADIO ALTIMETERS.................................... OFF
  ALLUMAGE MOTEUR.................................... IF NECESSARY    * LANDING LIGHTS.......................................... OFF
  FUEL CHECK................................................. IF NECESSARY      TPS................................................................ IF NECESSARY
  PRESSURIZATION........................................ ACTIVE & CHECKED  AIR COND. CHECK.................................... CHECKED
  HYDRAULIC PUMPS.................................. IF NECESSARY     PRESSURIZATION...................................... CHECKED
                                                                              Climb above 300 FL
  10 000 Ft. MSL
  ALTIMETERS..................................................... CHECKED   PRESSURIZATION...................................... PURGED
```

CRUISE FLIGHT

```
  ENGINE CHECK......................................... IF NECESSARY     DELAY CODES........................................... IF NECESSARY
  POINTS OF 1st FLIGHT OF THE DAY................ CHECKED
```

DESCENT

```
  PRESSURIZATION........................................ CHECKED        RADIO ALTIMETERS.................................. ON/TESTED
  LANDING DATA........................................... PREPARED      LANDING LIGHTS...................................... ON
  Descent below 180 FL or exit from cruising altitude which is          ASPIRATION VANE.................................... IF NECESSARY
  lower                                                                  COOLING GATES....................................... OPEN
  ALTI. AND BARO......................................... CHECKED       descent below 10 000 FT MSL or exit cruising altitude which
  (outside the american continent, zeroize upon starting                 is lower
  descent to an altitude lower than the transitional level)              HYDRAULIC PUMPS.................................. ON #
```

BEFORE LANDING
Use Mechanical checklist

AFTER LANDING - TAXI

```
  ANTI-SKID................................................... OFF
  BRAKES...................................................... FRONT
  BRAKE PRESSURE..................................... CHECKED
```

METHOD FOR STRUCTURING INFORMATION USED IN AN INDUSTRIAL PROCESS AND ITS APPLICATION TO AIRCRAFT PILOTING ASSISTANCE

BACKGROUND OF THE INVENTION

1—Field of the Invention

This invention relates to a method for structuring information used in an industrial process requiring a large volume of information of heterogeneous types and structures and coming from very varied sources.

It applies notably, though not exclusively, to commercial aviation where a sizable mass of information is used on board aircraft. This information relates e.g. to the different procedures to be carried out during each flight stage, to the data required to pilot an aircraft and to monitoring of the different devices therein.

This information comes from various sources, notably from aircraft constructors, equipment providers, suppliers of navigational maps, airline companies or even from on-board computers.

Accordingly, their type and structure can be very different, whence a difficulty in using them, and notably in looking up information. This information is usually gathered together by airline companies for the benefit of pilots and flight engineers.

2—Description of the Prior Art

In order to facilitate the exchange and utilization of all this information, a computer language has already been proposed enabling the definition of data structures which are then associated with the information itself so as to enable them to be entered and utilized independently of their source or destination. These data structures have been called logical structures.

However, it so happens that a same set of information can be associated with different logical structures as a function of the user of this information, his production requirements, and his utilization and look-up methods in the operating of a process.

In view of this fact, the user is often led to redefine these logical structures in order to adapt them to his own requirements.

At present, however, in order to be able to define a logical structure, the latter must be drawn in the form of a graph, using a graphical formalism which is not standardized, and this graph must then be transcribed into computer language. This process therefore implies in-depth knowledge of said computer language, which is only within the reach of specialists, as is the case with most computer languages.

As each airline company has specific requirements with regard to the utilization and looking up of this information, and as it does not usually have the skills enabling logical structures to be defined, it cannot fully take part in the defining and validating of the information structures it requires.

OBJECT OF THE INVENTION

The main object of this invention is to remedy this drawback, and notably to enable the speedy gathering of information coming from numerous sources, to assist users in formulating their own requirements with regard to the organization of this information and the way in which it will be used, independently of presentation.

SUMMARY OF THE INVENTION

Accordingly, it provides a method for structuring a set of information used in an industrial process, using a terminal comprising a processor, a screen and a keyboard providing access to controls enabling the input of graphical symbols and their characteristics represented on the screen, with a view to drawing up a graph representing an information structure model, this graph using at least symbols of a first type representing nodes, and symbols of a second type establishing links between the nodes.

This process comprises the following successive stages:
- step by step breakdown of the set of information into subsets and identification of the structure of each of the latter;
- grouping together by similar structures of the subsets into objects;
- determination of characteristics specific to each object;
- input into the terminal of each object in the form of a node type symbol and of its characteristics;
- input into the terminal of symbols corresponding to the construction link between objects, with specification of the types and characteristics thereof, these links indicating a hierarchical include relation between two objects;
- production by the processor, on the basis of the graph introduced into the terminal, of the structure model of the set of information expressed in a suitable computer language, and
- monitoring by the processor of the consistency of the model.

From the moment an object appears in a structure model, it necessarily appears in all the sets of information structured by this model. However, these objects can have the following two characteristics which can be combined:
- "optional" indicating that the object does not necessarily appear in a set of information structured by the model, and
- "list" indicating that the object in fact represents a sequence of one or more subsets having the same structures.

Furthermore, a first object of a structure model can be hierarchically linked by construction links to plural second objects as to form structures of the following types:
- "alternative", in which just one of the second objects must appear in each set of information structured by this model;
- "sequence", in which the second objects always appear in the order indicated on the graph (number near the link) in each set of information structured by this model; and
- "aggregate", in which the second objects appear in any order in the sets of information structured by this model.

By means of this method, it is no longer necessary to master a computer language defining information structures. The only knowledge required is that of the graphical formalism used by the method, which is considerably more accessible.

It thus enables uninitiated users, such as airline companies, to define the structure models they require.

Moreover, each object characteristic is defined by a type, and by a default value which must be compatible with the type.

Advantageously, it is also possible to establish reference links between objects to indicate that two objects refer to one another.

Advantageously, in addition to the monitoring of consistency performed at the end of construction of the graph, the terminal processor used by the method conducts dynamic checks after each graph construction command performed by the operator. These checks consist notably in only authorizing possible link creations and manipulations.

According to a feature of the invention, this method also comprises the conversion of a logical structure model, expressed in the computer language, into a graph drawn u? in compliance with the method embodying the invention. It is thus possible to modify an existing structure model from its graphical representation and not from its expression in the computer language.

The method embodying the invention applies more particularly to aircraft piloting assistance, which uses a plurality of lists of tasks that the pilot must necessarily perform during each piloting stage, these lists being stored in the memory of a processor-based computer on board the aircraft, and comprising at least one man/machine communications terminal. Each of these lists defines the concatenation of the different actions and checks that must be performed during a piloting phase either on ground or in flight.

Other task lists are notably used to process failures and emergency situations.

Each of these lists is usually in the form of a succession of tasks appearing in the order in which they must be performed.

To each of these lists correspond detailed comments situated in another set of information, concerning the list in general and its conditions of use, as well as the details and particularities of each of the tasks.

This information is beginning to be produced and provided in the form of computer files by aircraft constructors and equipment providers.

By means of the method embodying the invention, airline companies will be able to define, without any particular skills, the structure models and structures to be put on this information, as a function of their own updating and look-up methods.

This information thus structured can then be stored in the memory of a computer taken on board the aircraft and used from the terminal connected to the computer.

Advantageously, during performance on the on-board terminal of the tasks defined in lists having a structure, the method embodying the invention comprises:

- automatic concatenation on the terminal of the different lists at each new piloting stage, and automatic triggering of the appropriate list of tasks in the case of an identified failure, by means of the objects defining the structure of the task lists and of the links established between these objects;
- at the end of performance of each task, the marking of the next task to be performed, by means of the identification of the objects defining the structure of the tasks; and
- viewing on the terminal screen of comments concerning the task and the list of tasks being performed, by means of the objects defining the structure of the tasks, lists of tasks and sets of comments, and of the links between these objects.

BRIEF DESCRIPTION OF THE DRAWINGS

An embodiment of the terminal embodying the invention will be described hereafter, by way of a non-limiting example, in reference to the appended drawings in which:

FIG. 4 shows how the information is structured by the structure model by means of the generated code;

FIG. 5 shows an example of possible windowing from the information indicated in FIG. 4;

DESCRIPTION OF THE PREFERRED EMBODIMENTS

The method embodying the invention uses a terminal based on processors comprising a viewing screen and a keyboard enabling the commands to be activated with a view to defining a structure model for a set of information by means of a graphical formalism.

Figure 1:
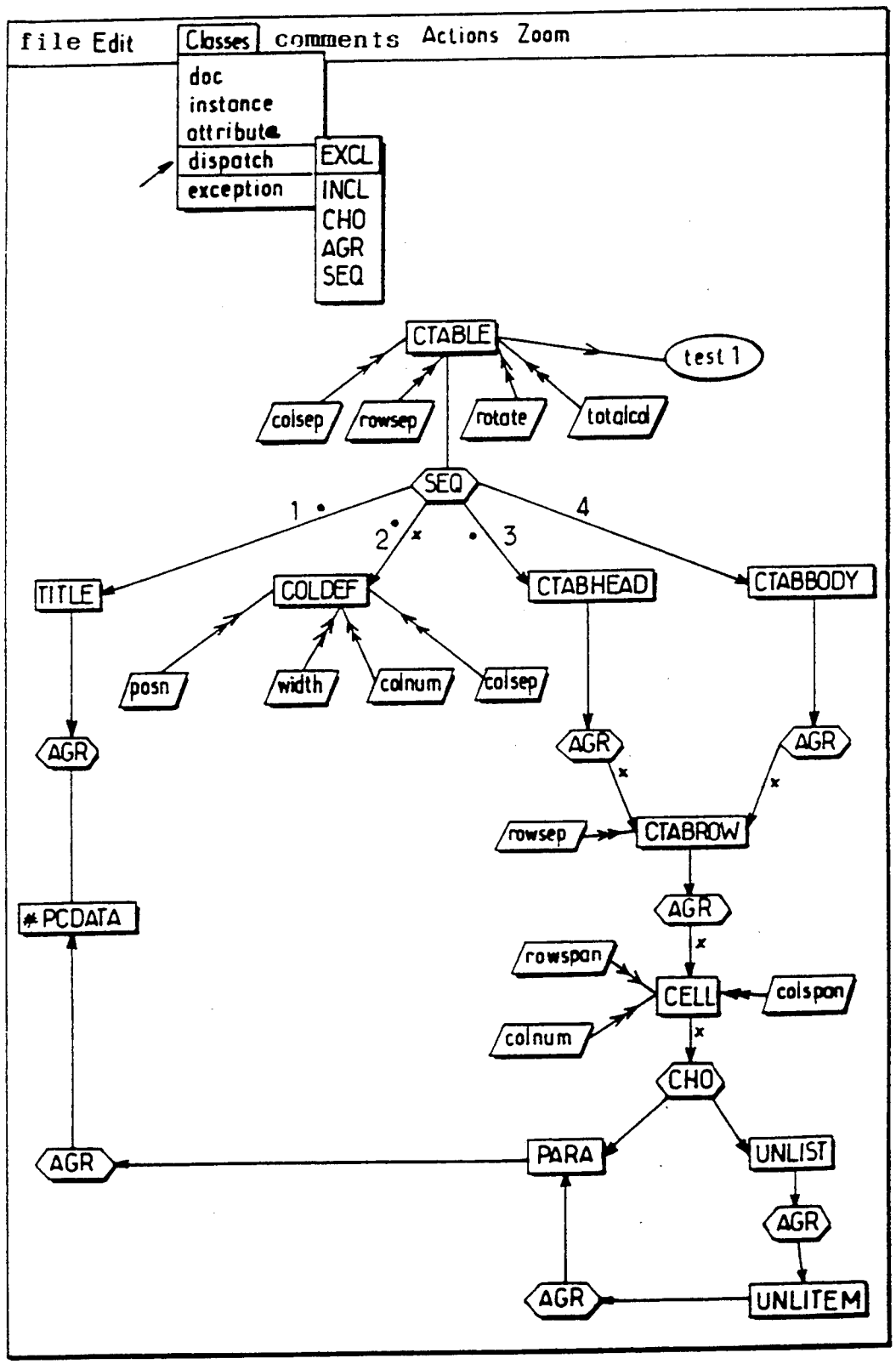
FIG. 1 represents the screen of the terminal showing a graph according to the method embodying the invention.

FIG. 1 represents a page displayed on the screen of the terminal. This page shows the graph of a structure model. On the top of this page are displayed the commands that can be activated, e.g. by means of a cursor that can be displaced over the entire screen with a mouse, i.e. "File", "Classes", "Actions" and "Zoom".

The "File" command provides access to the different actions that are possible on the files containing the structure model graphs, such as open, close, save and print.

The "Edit" command enables objects in the graph present on the screen to be deleted or copied.

The "Comments" command enables comments to be inserted on the graph present on the screen.

The "Actions" command provides access to the different commands that can be activated on the graph present on the screen, notably to the viewing and modification commands, and to the commands activating the verifications and consistency checks.

The "Zoom" command enables the scale of the graph on the screen to be increased or decreased.

The formalism used to construct these structure models consisted firstly in defining object classes and link classes needed for this construction, as well as the characteristics of these objects and links.

A structure model, such as e.g. the model in FIG. 1, is thus defined by means of objects belonging to the following classes, of which the list is displayed on the screen in a window when the "Classes" command is activated:

the DOC class of the objects representing information structure models, the ATTRIBUTE class containing the characteristics of the objects in the DOC class, the DISPATCH class of the objects representing the different types of possible hierarchical structures formed by the objects in the DOC class, and the INSTANCE class of objects representing the subsets of information, each one being symbolized by an ellipse ("test1"), and the EXCEPTION class of objects representing objects in the DOC class that the user wishes to delete from or add to any arborescence derived from the DOC class object to which the objects in this class are directly linked.

The objects in the DOC class, of which the graphical symbol forms, in FIG. 1, a rectangle framing the name of the object ("CTABLE", "TITLE", "COLDEF", "CTABHEAD", "CTABBODY", etc.), representing the different parts comprising the structure of a set of information (e.g. a title, columns, lines, fields, etc.).

An object in this class can have the following characteristics:

"optional", which indicates that the object is optional, an optional object being marked on the graph by a circle placed near the object, "list", which indicates that the object represents a list (e.g. of chapters or paragraphs), in which case a cross is marked near the object on the graph, and "cont.", marked on the graph by an arrow pointing to the object, indicating; that the arborescence derived from the object is not displayed.

In order to access the different commands acting on an object in this class, the mouse is used to designate one of these objects appearing on the graph. This operation triggers the display of a window whose title corresponds to the name of the object and which displays the following commands that can be designated by means of the mouse in order to activate them:

"generate the code" describing the structure of the designated object expressed in computer language, "read an instance", which has the effect of reading a file containing the definition of a structure expressed in computer language, of transcribing this structure into a graph and of associating it with the designated object, "rearrange graph", which has the effect of repositioning all the objects in the arborescence derived from the designated object, "arrange sons" of the designated object, if they are numbered, to position them from left to right on the graph as a function of their respective numbers, "display/hide sons" of the designated object to enable the arborescence derived from the designated object to be displayed or cleared, "display/hide attributes", which enables the attributes of the designated object to be displayed in a window in which they can be modified, "rename", which enables the name of the designated object to be modified, "inspect", which enables the characteristics of the designated object to be displayed in a window in which they can be modified, and "link", which enables the designated object to be linked to another object in the DOC class belonging to the graph.

From the "Edit" menu, it is also possible to delete or copy an object of any class by means of the "Cut", "Copy", "Paste" commands.

An object in the ATTRIBUTE class whose graphical symbol forms a parallelogram framing the name of the "colsep", "rowsep", "rotate" or "totalcol" attribute, represents a characteristic of the "CTABLE" object of the DOC class to which it is linked.

The objects in this class enable the objects in the DOC class to be better qualified, and enable a particular value to be associated with the different occurrences of this object which appear in the information sets structured by the model represented by the graph.

An object in this class has a type and a default value.

An attribute can be of one of the following types:

enumerated, in which case the list of possible values must be supplied, textual, reference to an object outside the structure, list of references to objects outside the structure, identifier of an object in the structure, reference to an identifier of an object in the structure, list of references to identifiers of objects in the structure, name: chain of 8 characters maximum, whether alphabetical, dashes or dots beginning by a letter, list of names, chain with a maximum of 8 alphanumeric characters, list of chains with a maximum of 8 alphanumeric characters, chain with a maximum of 8 alphanumeric characters beginning by a digit, lists of chains with a maximum of 8 alphanumeric characters beginning by a digit, notation defined in a file, number with a maximum of 8 digits, and list of numbers with a maximum of 8 digits.

The default value of an attribute must, of course, be compatible with the attribute type. It can be:

to be entered, fixed, in which case it is the only possible value for all objects of all information sets structured by this model;

to be specified obligatorily;

equal to the last value specified for the corresponding attribute in the information set;

optional; and equal to the default value of another attribute.

Modification of an object in this class is carried out in the same way as for an object in the DOC class by designating beforehand, on the graph displayed on the screen, the attribute to be modified.

The different commands possible for an object in this class are as follows:

"rename", which enables the name of the designated object to be modified, and

"inspect", which enables the type and default value of the designated attribute to be displayed in a window in which they can be modified.

The objects in the DISPATCH class, each symbolized by a hexagon ("SEQ", "CHO", "AGR"), enable the different types of possible hierarchical structure models to be represented. They can be of the following types:

"SEQ", which indicates a sequential type structure in which are arranged (in the order in which they appear on the graph) the objects of the DOC class directly connected to a "SEQ" type object, "AGR" which defines an aggregate of objects of the DOC type in which the objects directly connected to an object of the "AGR" type can appear in any order whatsoever in the information set structured by the model, "CHO" to define a set of choices in which just one of the objects in the DOC class directly connected to an object of the "CHO" type must appear in an information set structured by the model, "EXCL" to indicate that the DOC class objects related to it must be deleted from the entire lineage of the object to which this object is linked, and "INCL" to cancel the effect of "EXCL" throughout the lineage of the DOC class object to which it is related.

Construction of a graph according to this formalism consists firstly in creating a first object of the DOC type representing the information set. To do so, the "Classes" command must be activated, thereby causing the screen to display a menu providing the list of classes (FIG. 1). DOC Class must then be selected, which enables the displaying of a new menu enabling selection of a possible action on an object of this type.

In this instance, the "create" option is selected, and this requires the entry of a name to be attributed to the object one wishes to create, i.e. "CTABLE", as well as the definition of its characteristics.

Once this entry has been completed, a rectangle containing the name entered appears on the screen. This rectangle, which represents the object that has just been created, can be displaced on the screen by means of the mouse.

To continue building the model, the sequence described above must be repeated to create the objects representing the different subsets and elements of the information set.

As previously mentioned, the construction of a graph also consists in linking the different objects to one another in order to describe a structure, whether hierarchical or not.

To create a link between two objects, the operator firstly designates the source object of the link by means of the mouse. He then requests the creation of a link by activating the "Actions" command which causes a menu containing the "link" operation to be displayed in a window. After activating this command, and subsequently designating the destination object, a new window is displayed in which a menu enables a link class to be selected. These classes are as follows:

the L-CONSTRUCTION class of links enabling the hierarchical include structure of the objects in the DOC class to be represented with the objects in the DISPATCH class;

the L-ATTRIBUTION class of links enabling the objects in the ATTRIBUTE class to be linked with the objects in the DOC class;

the L-RECURSIVE class of links which enable a recursive structure to be specified by directly or indirectly linking an object with itself; and the L-REFERENCE class of links enabling indication of the fact that an object refers to another object.

The construction links (L-CONSTRUCTION and L-RECURSIVE classes) enable the hierarchical structure of a model to be defined by describing the breakdown of the objects from the highest level (information set) to the lowest level. They have certain characteristics which notably determine:

the sequence number in the case of an arranged sequential structure, displayed on the graph near the link, whether the destination object can be repeated to define an iterative structure, this characteristic is materialized on the graph by a cross near the link, or whether the object is optional, i.e. if it does not have to appear in an information set structured by the model, this characteristic is then materialized by a dot near the link.

The recursion links (L-RECURSIVE class) are special construction links as they enable specification of the fact that an object is itself comprised of objects of the same structure. However, links in this class must be used in accordance with certain rules to avoid triggering an infinite loop process. To do so, the structure comprising a link in this class must comprise at least one stop condition, such as e.g. an optional element that can interrupt the loop if this element is no longer added, or a choice structure in which the recursive link is one of the choices.

The links in the L-REFERENCE class enable two objects to be linked in order to indicate that the source object of the link refers to the destination object. This feature enables reference links to be systematically established, respectively between all the information sets derived from the source object, and all the sets derived from the destination object.

The reference links are associated with semantics described by a label, an expression or a function.

This label enables the validity of the link to be indicated. It enables e.g. the defining of a link that can only be activated for a given type of plane or for a given airline company.

An expression designating e.g. a particular attribute and its value, enables the defining of a link that can only be activated towards the objects having this attribute with this value.

A function enables the description of a calculation operation to be performed between the source object and the destination object of the link.

The commanding of a reference link causes the creation, at the referenced link, of an attribute of the object "identifier" type having as default value the value of the referencing object, and at the referencing object, of an attribute of the "reference to an object" or "references list" type having as default value the reference of the referenced object.

These reference links can be of the generic type. In this case they can be of several types:

"node-sons", the creation of such a link between an object A and an object B, both in the DOC class, entails the generating of reference links between object A and the "sons" of object B, the sons of an object being the DOC type objects directly connected to this object by construction links;

"sons-node", the creation of such a link between an object A and an object B entails the generating of reference links between the sons of object A and object B; and "sons-sons", the creation of such a link between an object A and an object B entails the generating of reference links between the sons of object A and the sons of object B; and "brother-brother", the creation of such a link, starting from an object A and looping back on itself, entails the generating of reference links between the sons of object A.

During construction of a structure model graph, a certain number of dynamic checks are carried out by the processor, and consist in only authorizing operations leading to a consistent graph.

These checks concern the creation of the objects and links.

With regard to the objects, the creation of two DOC class objects witch the same name is forbidden. However, on a graph, the symbol of a particular object can be duplicated, in which case the two symbols designate the same object.

The creation of links is governed by the following rules:

- the linking of an object to one of its fathers by a construction link is forbidden; this would form a cycle, and therefore a recursion; to perform this link, a link in the L-RECURSIVE class must be used;
- the linking of two "alternative" objects with a common father through a construction link is forbidden as only one of these objects must figure in an information set associated with this structure;
- a recursive link can only be created if it does not create an infinite loop without a stop condition;
- with regard to generic links of the "node-sons" or "sons-node" types, the destination object or object of origin of the link must comprise sons; and
- in the case of generic links of the "sons-sons" type, the number of sons of each object must be identical, otherwise the ensuing generation of reference links ceases when all the sons of the source or destination object have been respectively linked to a son of the destination or source object.

These checks are carried out as follows: e.g., in the case of an operator creating a link which forms a cycle, and therefore a recursion, in order to define the type of link to be created, the terminal will only propose to the operator, in the link class selection menu, the L-RECURSIVE and L-REFERENCE classes, and will not propose the L-CONSTRUCTION class which is not authorized in this case.

These checks can be de-activated so as to enable the generation of complex structures of which certain intermediary construction stages result in an inconsistent structure.

On a graph of this type displayed on the screen as represented in FIG. 1, the possible commands are as follows:

"Demons ON/OFF", which enables the activation or deactivation of the tasks conducting the verification tests as a graph is constructed, "Display characteristics", which enables the displaying, near the L-CONSTRUCTION class links, of the associated sequence numbers when they define a sequential type structure, "Read a DTD", which has the effect of transcribing a logical structure model expressed in computer language into a graph of the type previously defined, "Display/Hide attributes", which has the effect of displaying or clearing the ATTRIBUTE class objects on the graph, "Search object" which pops up a window enabling the entry of the name of an object to be searched; if said object exists on the graph, it is marked e.g. by a reverse video display, and "Verify construction", which enables the verifying of graph consistency to be activated.

Verification of the graph's consistency notably concerns the choice structures using the "CHO" type object which must be linked to at least two DOC type objects on the hierarchical level immediately below.

Figure 2:
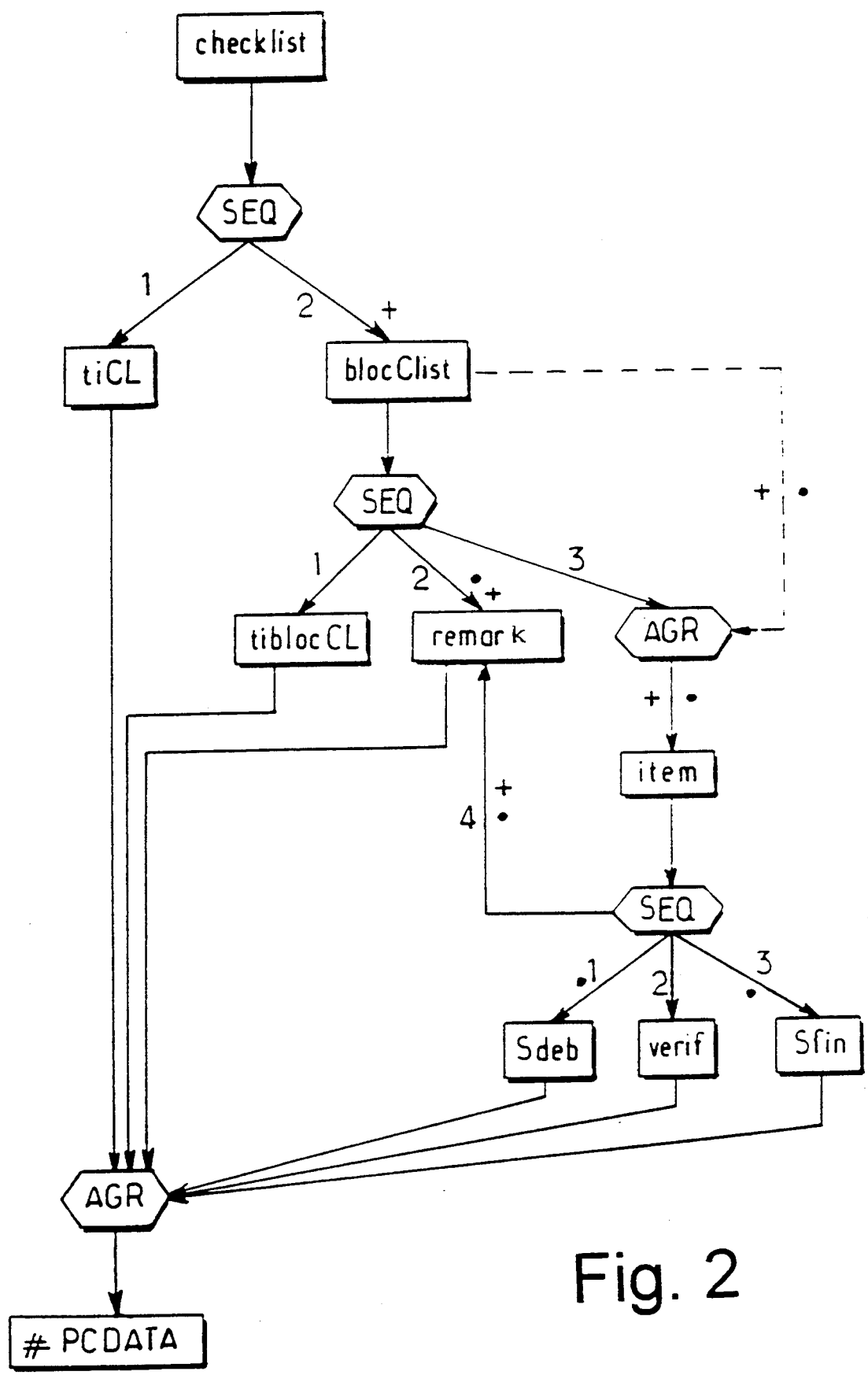
FIG. 2 represents the graph of the structure model of the information required for aircraft piloting assistance.

FIG. 2 represents the structure model of the information set enabling construction of the lists of tasks to be performed at each stage of an aircraft's flight.

This information set represented by an object in the DOC class, called "checklist", has, at its first level, an arranged sequential structure "SEQ" whose links are numbered from 1 to 2. This structure is firstly comprised of the DOC class object called "tiCL" (first link) representing the title of the information set, then an object called "blocClist" (second link) of the "list" type (a cross figures beside link 2 towards the object). This object represents a list of blocks belonging to this set.

The "tiCL" object is constituted by an object called "#PCDATA", that cannot be broken down and that represents text.

Each element in the "blocClist" list has an arranged sequential structure "SEQ" successively comprising the following three elements:

- a first element entitled "tiblocCL" representing the title of the block,
- a second element entitled "remark", which is optional and of the list type (marked by a dot and a cross near the link), and
- a third element with an aggregate structure "AGR" comprised of two optional objects of the list type entitled "item" and "blocClist".

On this particular point, it should be noted that the link between the "AGR" object and the "blocClist" object (represented in broken lines) belongs to the L-RECURSIVE class as it indirectly links the "blocClist" object to itself. This link indicates that the "blocClist" object can be itself comprised of objects of the same structure.

Like the "tiCL" object, the "tiblocCL" and "remark" objects are comprised of "#PCDATA" objects that cannot be broken down and that represent text.

The "item" object has an arranged sequential structure "SEQ" successively comprised of the following four objects, which are themselves comprised of objects that cannot be broken down and that represent text:

optional "Sdeb",
"verif",
optional "Sfin", and
optional "remark" of the list type.

In this structure, it can be observed that the "blocClist" and "item" objects can comprise the "remark" object having the "list" and "optional" characteristics.

This simply means that the information subsets of "blocClist" and "item" structure comprising the checklist structure set, can comprise a list of remarks.

Figures 3, 7:
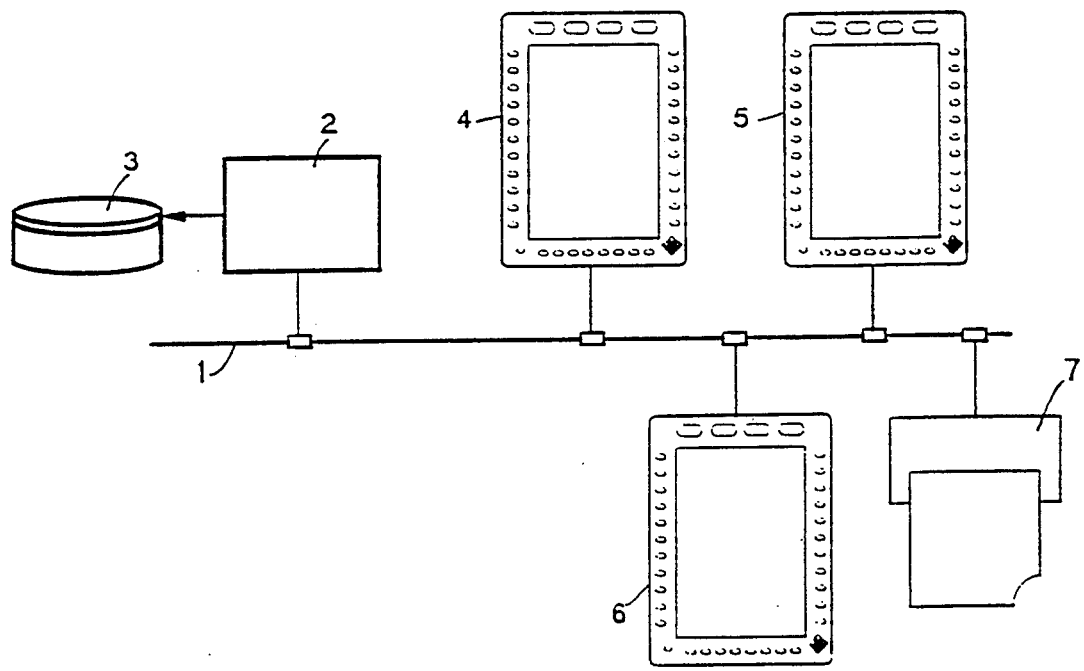
FIG. 3 shows the code generated from the graph in FIG. 2.
FIG. 7 is a schematic representation of the architecture of a system taken on board an aircraft applying the method to the industrial process of aircraft piloting assistance.

FIG. 3 shows the translation into SGML (Standard Generalized Marking Language) of the graph represented in FIG. 2. Each line of this translation enables the defining of the name (subsequent to the "!ELEMENT" keyword) of each object in the DOC class represented in FIG. 2, and the defining of the sons of each object (indicated between brackets). The type of each son is indicated after the name of the son:

"+" indicating a list,
"?" indicating the optional character, and
"*" indicating an optional list.

The sons forming a sequence are delimited by a comma, whereas those forming an aggregate are delimited by the ampersand "&".

In FIG. 4, the names of the DOC type objects previously defined to describe the "checklist" structure, serve as keywords to delimit the fields constituting the information set structured by this model.

The start and end of a field are thus marked by the keyword between angle brackets, e.g. "<blocClist>" which marks the start and </blocClist>" which marks the end.

By means of this method, it is possible e.g. to define a presentation of this information set from the structure model alone and independently of its contents. In this way, the information structured according to the model represented in FIG. 2 can be presented as follows (FIG. 5): the title of the information set referenced by " tiCL" is indicated in large letters at the top of each page, e.g. "B-727 LIST OF NORMAL PROCEDURES". Then follows the title " tiblocCL" of each block of the "blocClist" structure, followed by a list of items presented in two columns, and possibly associated with remarks.

Thus, e.g. the first subset of the "blocClist" type is entitled "AFTER TAKEOFF—ASCENT". It includes three items (or "item" structure subsets) whose "verif" field is filled in, as well as the "Sdeb" and "Sfin" fields of the first and third items which correspond respectively to the "*" and "#" characters:

| * | LANDING GEAR | OFF # |
|---|---|---|
|   | HIGH INTENSITY LIGHTS | ON |
| * | FLAPS | UP # | and four subsets of the "blocClist" type each including subsets of the "item" type and whose respective titles are underlined:

After cleaning of the aircraft
10,000 ft. MSL
18,000 ft. MSL
Ascent above 300 FL.

Other classes of objects have been added to those previously described in order to be able, on the one hand, to represent the structures of information sets derived from these structure models, and, on the other hand, to establish reference links between particular information sets and not between structure models.

Thus, the INSTANCE class groups together the objects giving a precise definition of the structure of a given information set. An object in this class thus represents a structure in which all the elements implying a choice have been specified.

These objects can be linked to the DOC class object from which they are derived, by means of an LINSTANCE class link (see the "test1 represented" object in FIG. 1).

They can be represented by means of a graph called an instance, in which there are no longer any objects of the DISPATCH class, nor DOC class objects of the "list" or "optional" types, or L-RECURSIVE class links, the latter being developed into as many construction links as there are cycles in the information set.

Furthermore, on such a graph, the DOC class objects have become objects in the FINAL-DOC class, each one being associated with a part of a particular information set. The FINAL-DOC class therefore groups together the objects of the DOC class once they have been applied to a given information set.

The ATTRIBUTE class is also replaced by the FINAL-ATTRIBUTE class which groups together the attributes of the objects in the FINAL-DOC class whose value has been clearly defined.

The following are the possible actions on an instance graph:

view the deletable objects, the objects in the FINAL-DOC class being susceptible of having this characteristic, arrange the graph to replace the different objects constituting the graph in a more legible manner, display/hide the attributes of the FINAL-DOC class objects, search for an object from its name, and "demons ON/OFF" to activate or de-activate the graph consistency verification tasks as it is modified.

The actions that can be carried out on a FINAL-DOC class object that has been previously designated by means of the mouse, are as follows:

display/hide the attributes of the designated object, display/hide the sons: of the designated object, arrange the sons of the designated object when they are part of a sequence so as to position them from left to right in ascending order, and view, to display the text represented by the designated object.

These objects have the following characteristics:

deletable indicates whether the object can be deleted from the information set, type indicates the type of information represented by the object (text, graphic, image, etc.), file indicates the name of the file in which the information represented by the object can be found, start indicates the starting position of this information in relation to the file in which it is located, end indicates the end position of this information in relation to the file,.

instance indicates the identification number of the DOC class object defining the structure model of this object, and model name indicates the name of this DOC class object.

The attributes of a FINAL-DOC class object each have a final value equal to the information they represent, in addition to the values from the attribute corresponding to the structure model. In other words, each object on an instance graph describing the structure of an information set corresponds to a field (or a part) of the latter.

Figure 6:
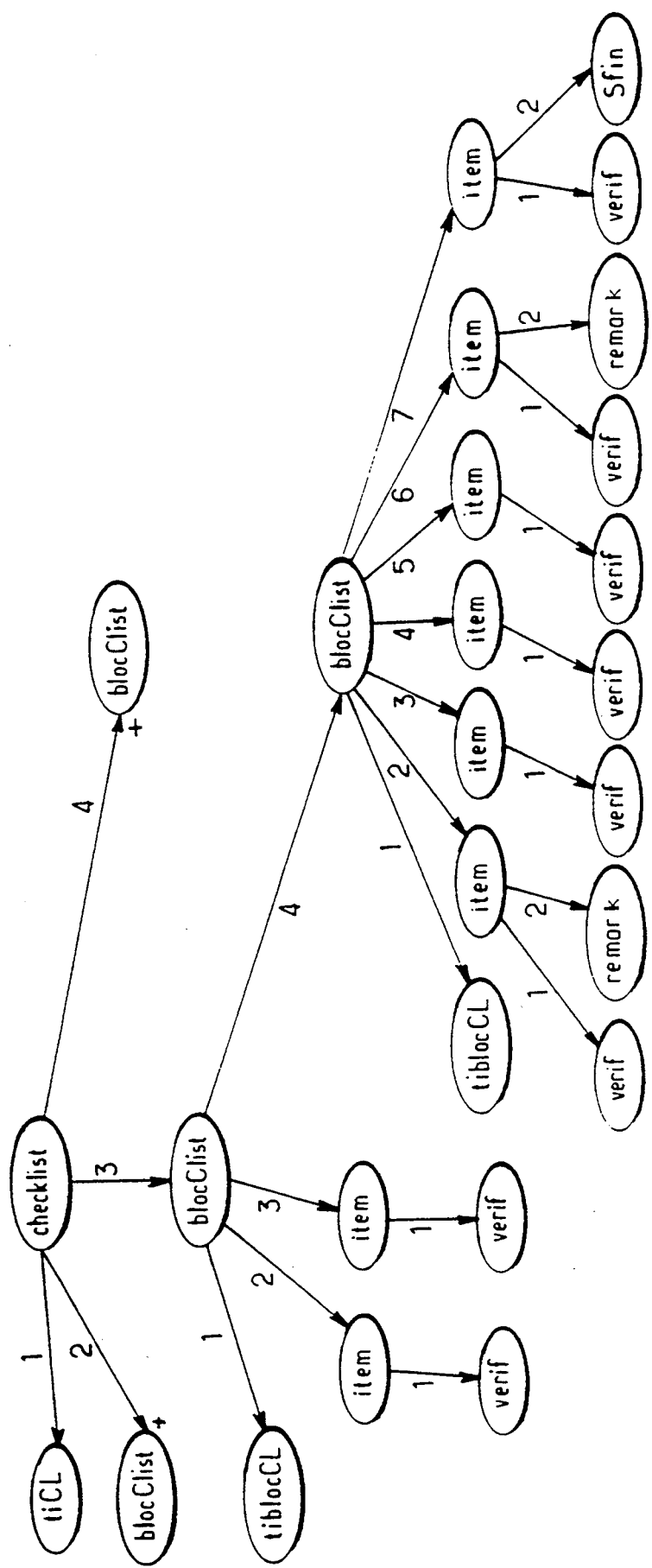
FIG. 6 represents a structure graph ensuing from the application of the graph represented in FIG. 2 to a particular list.

In this way, when the graph in FIG. 2 is applied to the contents of the lists presented in FIG. 5, the instance graph represented in FIG. 6 is obtained, showing the structure specific to each list deriving from the structure model defined by the graph in FIG. 2.

For material reasons, only the block entitled "DESCENT" in the "B-727/LIST OF NORMAL PROCEDURES" list has been developed in this figure.

This figure represents, in the form of ellipses, all the FINAL-DOC class objects derived from the DOC class objects appearing in the "B-727/LIST OF NORMAL PROCEDURES" list in FIG. 5.

It can be observed that all the DISPATCH class objects have disappeared, the DOC class objects of the "list" type having been replaced by as many INSTANCE class objects as there are corresponding subsets in the information set thus represented. Furthermore, the L-RECURSIVE class link has been broken down into as many construction links as there are "blocClist" structure subsets included in one another. Moreover, the optional objects only appear when they have a correspondence at information set level.

Thus, by reading the correspondence between FIGS. 5 and 6, the "checklist" object corresponds to the list of normal procedures. It is comprised of a title, "tiCL", whose value is "B-727/LIST OF NORMAL PROCEDURES", of a set of "blocClist" type objects (not represented in the figure), and of a "blocClist" type object that is represented, and of another set of "blocClist" type objects.

The "blocClist" type object represented successively comprises a first "tiblocCL" type object whose value is "DESCENT", two "item" type objects each comprising a "verif" type field respectively having the following values:

| | PRESSURIZATION | ACTIVATED AND VERIFIED |
|---|---|---|
| and | LANDING DATA | PREPARED | and another "blocClist" type object corresponding to a sublist.

Like the other objects of this type, this sublist is broken down into a "tiblocCL" type object corresponding to its title, in this example "Descent below 180 FL or exit cruising altitude which is lower". This sublist comprises, in a predetermined order, six "item" type objects each comprising a "verif" type object which, as previously, indicates a device on the aircraft and the task to be performed on this device.

In addition, the first and fifth "item" type objects each also comprise a "remark" type object whose respective value is:

"(outside of the American continent, zeroize upon starting descent to an altitude lower than the transitional level)", and "descend below 10,000 ft MSL or exit cruising altitude which is lower".

Furthermore, in addition to the "verif" type field, the sixth "item" type object comprises an "Sfin" type field with a value of "#".

Such a graph notably enables reference links to be established between the different objects it contains or with other objects of the same type defined in other graphs.

To establish the reference links between objects of two instance graphs, the user need simply, firstly command the editing of the two graphs which then appear on the screen in two different windows. The source object of the link must then be designated in a window, the "link" operation is then commanded in the "actions" menu, before designating the destination object of the link in the other window.

The structures defined according to the method are then used by a device operating the information thus structured.

The diagram represented in FIG. 7 shows an example of architecture of a system intended to be taken on board a commercial plane, applying the method according to the invention for piloting assistance.

This system is comprised of a local network 1 to which are connected:

a central processing unit 2 managing the accesses to the local network and to a bulk memory 3 which can be comprised of plural units of the magnetic, optical or magneto-optic disk type in which the lists of tasks and their structures are notably stored, communication terminals 4, 5, 6 adapted to utilization on board a commercial plane, and in particular in the pilot's cockpit where the available space is relatively small, and a printer 7.

It can be connected to the busses of the plane for real time acquisition of the data generated by the other on-board electronic systems.

Figure 8:
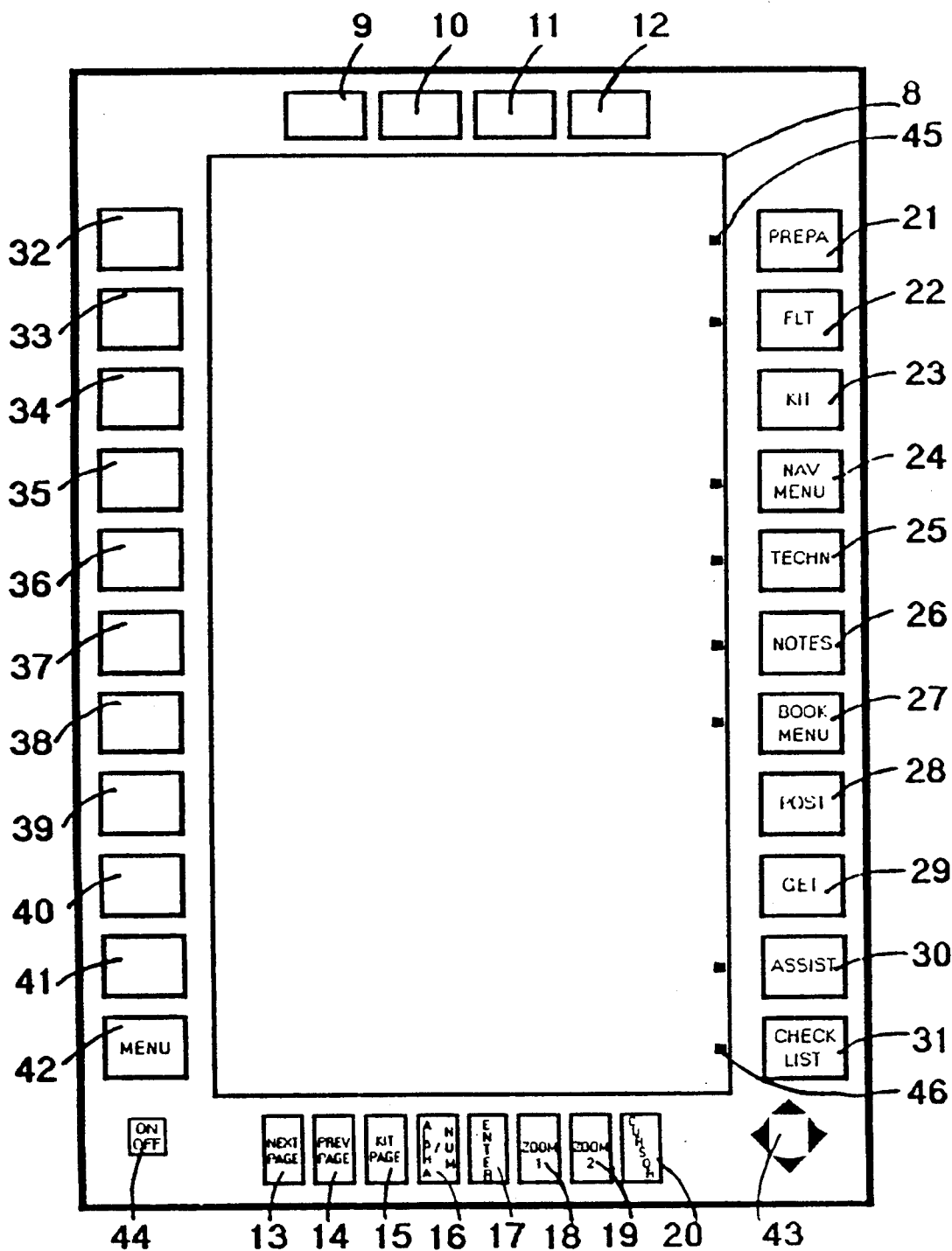
FIGS. 8 to 13 represent the different screens concatenated by the system during performance of a list of tasks.

An on-board terminal is represented in FIG. 8. It is comprised of a rectangular viewing screen 8 around which keys are spread, i.e.:

four keys 9 to 12 aligned along the upper edge of the screen 8, eight keys 13 to 20 aligned along the lower edge of the screen 8, eleven keys 20 to 31 and 32 to 42 respectively aligned along the right-hand and left-hand edges of the screen 8, a displacement key 43, situated in the lower right-hand corner of the terminal, representing four arrows to displace a cursor or the image on the screen in all four directions, and a key 44 situated in the lower left-hand corner, marked "ON/OFF", to power the terminal up or down.

Certain keys have a predetermined function, in which case the name of the function is mentioned on the key.

However, these keys can be reconfigured as a function of the page displayed on the screen, either to activate other functions, or to enter chains of characters. In this case, the name of the function attributed to each key or the corresponding character is indicated on the screen, near the key.

Each key can have two or three statuses:

a non-activatable status when the key is not assigned to any function, an activatable status when the key enables a function to be activated, and an active status when the predetermined function associated with the key is being performed.

Near each of the keys with a predetermined function, can be found a status indicator 45, 46 (represented by a square in the figures), which, when lit, indicates that the is key is active (in white in the figures) or activatable (in black), according to the color of the indicator lighting and which, when not lighting (invisible in the figures) indicates that the key cannot be activated.

Keys not assigned to a predetermined function can be either activatable, if a function name figures on the screen near the key, or non-activatable otherwise.

The keys in the right-hand column 21 to 31, named "PREPA" 21, "FLT" 22, "KIT" 23, "NAV MENU" 24, "TECHN" 25, "NOTES" 26, "BOOK MENU" 27, "POST" 28, "GET" 29, "ASSIST" 30 and "CHECK LIST" 31 are assigned to the main functions of the terminal, such as e.g. "PREPA" 21 for flight preparation or "CHECK LIST" 31 for piloting assistance.

Keys 32 to 41 in the left-hand column usually enable selections to be made when menus are displayed on the screen.

The last key in the left-hand column, called "MENU" 42, enables the displaying of the last menu which provided access to the current page. This key can be activated several times consecutively. In this case, the different menus concatenated to access the current page are successively displayed up to the first menu of the corresponding main function.

Keys 13 to 20 in the row below the screen enable terminal management-related functions to be activated, i.e. from right to left:

"NEXT PAGE" 13 which displays the next page,

"PREV. PAGE" 14 which displays the previous page,

"KIT PAGE" 15 which activates the memorizing of the page displayed on the screen in a special memory, "ALPHA/NUM" 16 which enables switching from an alphabetical entry mode to a numeric entry mode, and vice versa, "ENTER" 17 to validate a choice or an entry, "ZOOM 1" 18 and "ZOOM 2" 19 which enable the page on the screen to be enlarged by two scale factors respectively, and vice versa, and "CURSOR" 20 which enables a cursor to be displayed.

The four keys 9 to 12 situated above the screen indicate the names of the last 4 choices made by the operator. Unlike the "MENU" key 42, these choices can correspond to different main functions.

To activate the piloting assistance function, the user need only press the "CHECK LIST" key 31 which is permanently activatable depending on the color of the status indicator 46 associated with it (e.g. on the screen in FIG. 8).

The terminal transmits the order to activate the "CHECK LIST" function to the central processing unit 2 which searches, in the bulk memory 3, the structure of the "checklist" information set whose structure is represented in FIG. 6. The central processing unit 2 uses this structure to search for the corresponding information in the bulk memory 3, and transmits, to the terminal, the information concerning the first list to be processed according to the format as represented in FIGS. 3 and 4.

Figure 9:
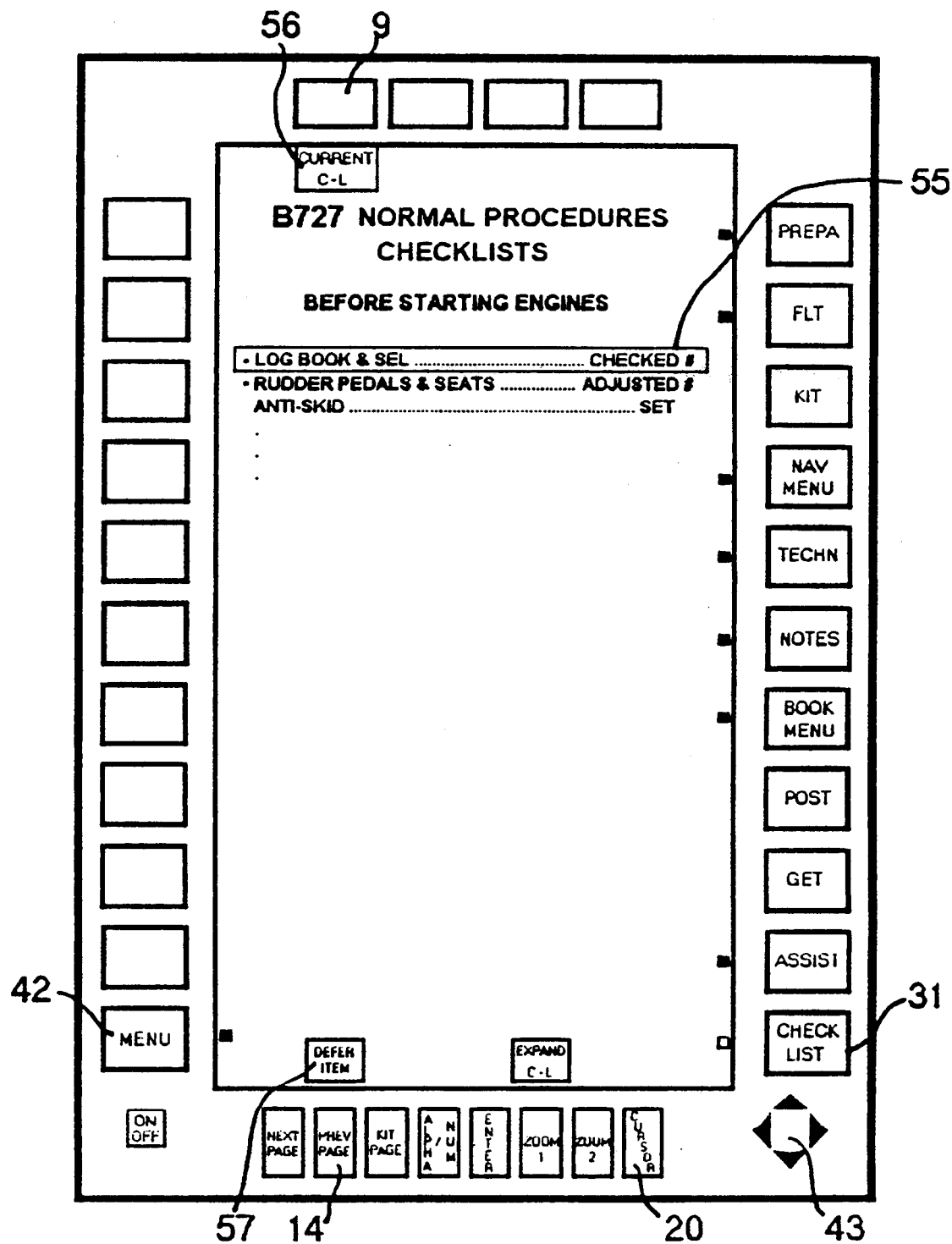

The terminal then uses the structure and the information transmitted to it, and in particular the structure of the "blocClist" object, to display them on the screen according to a predetermined presentation (FIG. 9).

Thus, the first list displayed is entitled "PRIOR TO STARTING ENGINES" and corresponds to the task to be performed before starting the engines.

The indicator 46 associated with the "CHECK LIST" key 31 has become active (represented by a white square), indicating that the associated function is being processed.

The "ZOOM 1" key ]8 is reconfigured to "EXPAND CL-L" 53 and enables the comments associated with the current list to be displayed on another page.

The "CURSOR" key 20 has enabled a marker to appear on the first task of the list displayed. The displacement of this marker on the different tasks in the list is then commanded by means of key 43, with only the downward displacement command being activatable.

By means of the information structure transmitted to it, and in particular of the structure of the "blocClist" object broken down into "item" structure elements, the terminal is able to delimit each task in the item structure list and to concatenate them to display and displace the marker.

To perform a list of tasks, the operator must command the displacement of the marker by means of key 43 when the task designated by the cursor has been completed, which has the effect of validating this task and of positioning the cursor on the next task. This is the only authorized movement of the cursor.

The operator can display and displace a cursor on the screen. To do so, he must firstly activate the "CURSOR" key 20 to display the cursor. This action has the effect of interrupting the processing of the list of tasks in process and of assigning key 43 to cursor displacement.

If the operator now positions the cursor on one of the fields comprising the structure of the task list ("tiCL", "tiblocCL", "remark", "Sdeb", "verif", "Sfin"), and activates the "ENTER" key 17, a commentary associated with the field thus designated appears on the screen in a pop-up window. In this status, if the operator again activates the "ENTER" key 17, the screen resumes its appearance (as represented in FIG. 9) and the processing of the task list can be continued.

Figure 10:
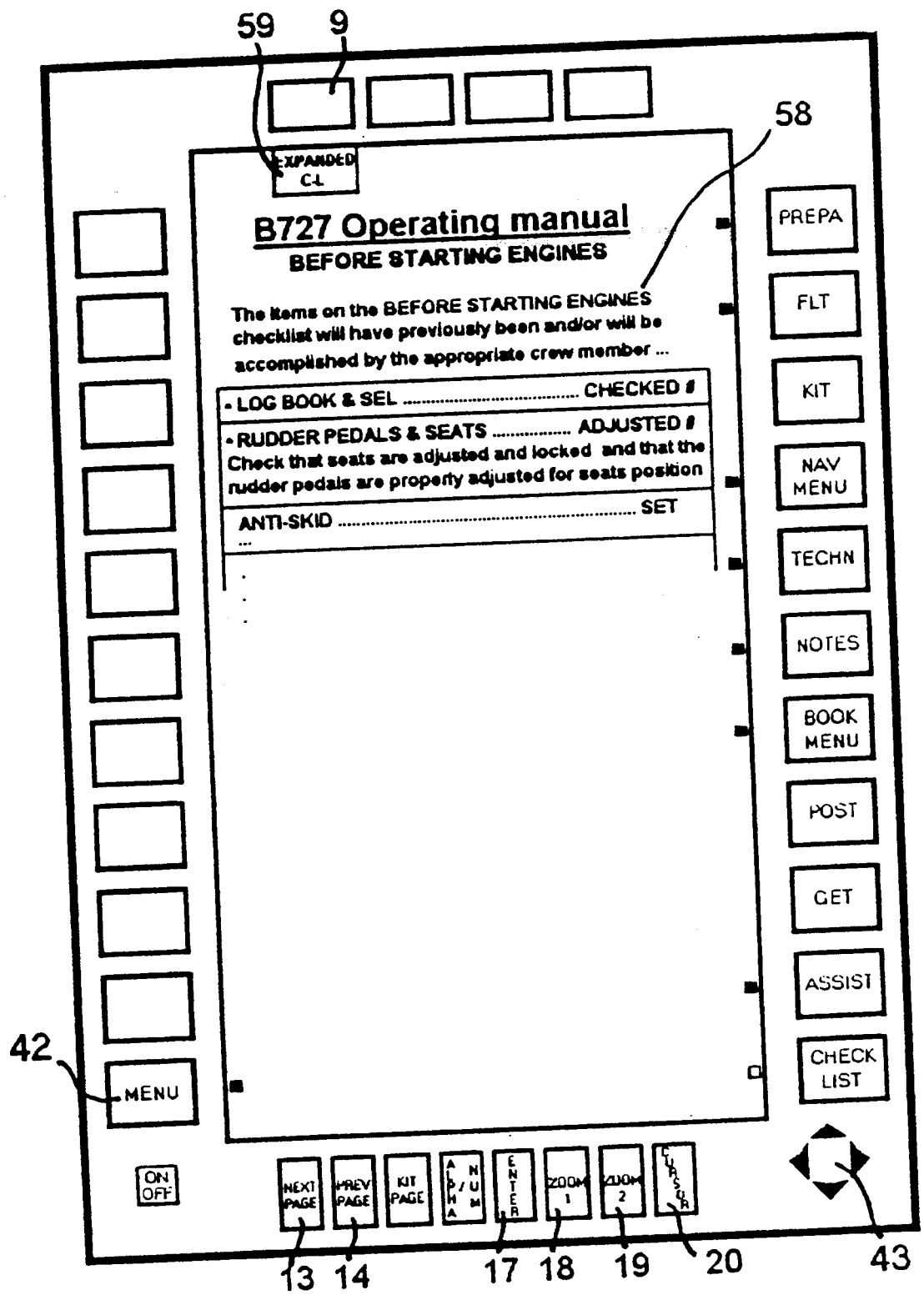

If the operator presses the "ZOOM 1" key 18 which has been reconfigured into "EXPAND C-L" 53, the screen represented in FIG. 10 is displayed.

On this screen appears the start of the previously displayed list (in FIG. 9) "PRIOR TO STARTING ENGINES", but this time, the title and wording of the tasks are each associated with a commentary concerning, firstly the list in general, then each task in the list.

During this operation, or the operation previously described consisting in designating a field by means of a cursor, the terminal has commanded the central processing unit 2 to search the commentaries for the current list. The central processing unit 2 then searched the commentaries associated with each field in the current list, by means of the reference links linking the objects on the instance graph of the current list to the objects on the instance graph of the information set containing these comments. This information is then transmitted to the terminal for display on the screen.

From the screen represented in FIG. 10, the operator has access to all the commentaries associated with this list, by means of the "NEXT PAGE" 13 and "PREV. PAGE" 14 keys which respectively enable the next and previous pages to be displayed. If the first page of comments on the list is displayed, only the "NEXT PAGE" key 13 can be activated.

The operator also has the possibility of enlarging part of the screen by means of the "ZOOM 1" 18 and "ZOOM 2" 19 keys which have become activatable.

The "ENTER" key 17, which can be activated, enables the operator to return to the previous screen (FIG. 9).

The first key 9 in the upper row has become "EXPANDED C-L" 59, thereby indicating that the page displayed is a commented task list.

Figure 11:
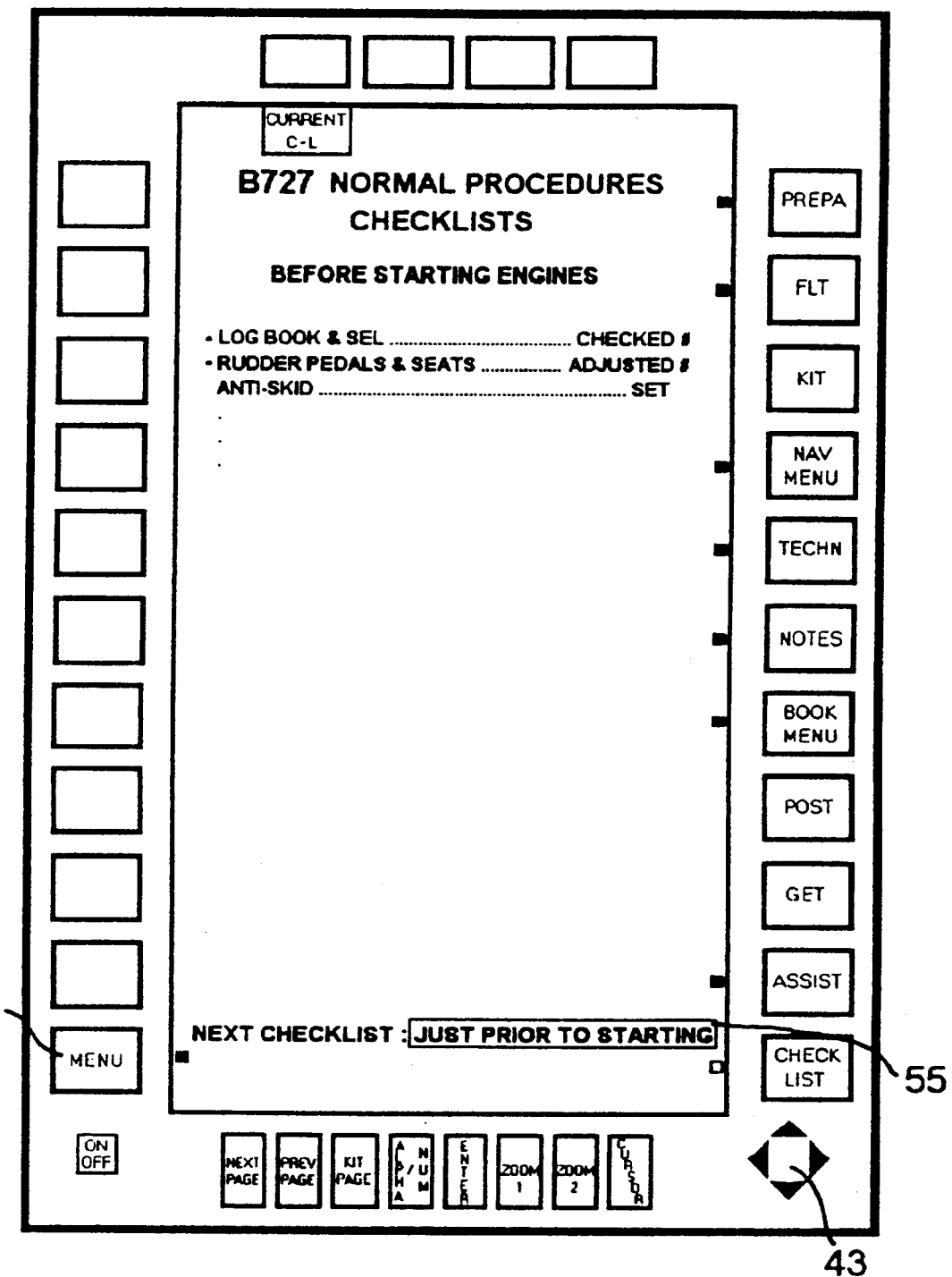

FIG. 11 shows the same list, the marker 55 being positioned on the title of the next task list "IMMEDIATELY PRIOR TO STARTING UP".

Processing of the current list is then completed.

To achieve this result, the operator successively validated all the tasks in the list by means of key 43, after having performed them. Every time key 43 was activated, the terminal displaced the marker 55 onto the next task by using the "blocClist" object structure to successively mark all the "item" objects comprising it, in the order of the sequence indicated by this structure.

Such a management of the marker 55 enables all the tasks in a list to be guaranteed to have been performed.

Validation of the last task in the list led the terminal to request the information concerning the next list from the central processing unit 2. To supply this information, the central processing unit uses the "checklist"

object structure, which is broken down into "blocClist" structure objects (FIG. 6) in order to determine the next list of tasks.

Once it received the information requested, the terminal displayed the title of the next list surrounded by the marker 55 (FIG. 11).

Figure 12:
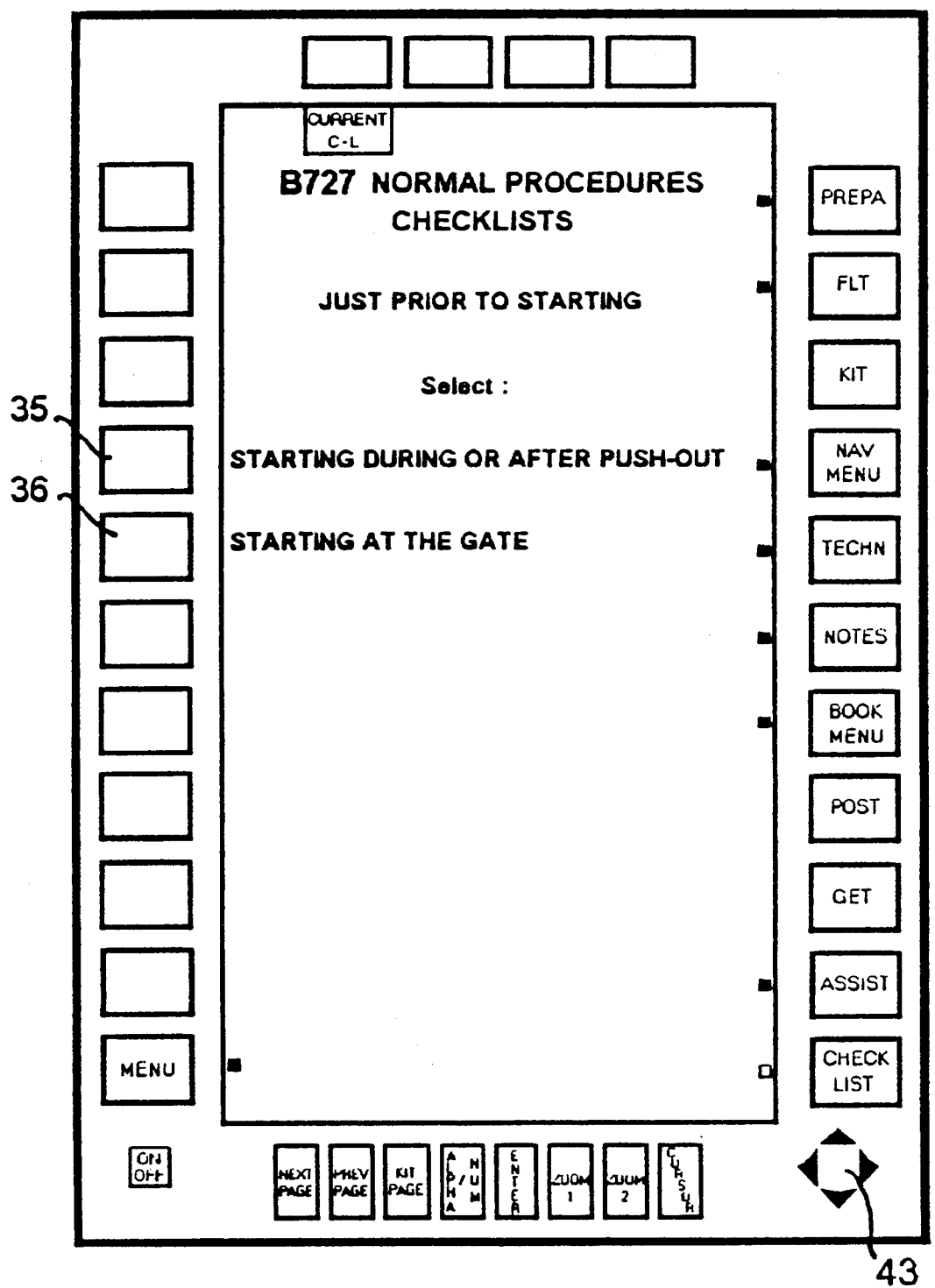

If, from the screen represented in FIG. 11, the operator again activates the displacement key 43, the screen represented in FIG. 12 appears on the screen.

In the structure it received from the central processing unit 2, the terminal detected two "blocClist" objects comprising the object of the same type corresponding to the "IMMEDIATELY PRIOR TO STARTING UP" task list. It is for this reason that it displayed the titles of these objects respectively entitled "START DURING OR AFTER TOWING" and "START AT GATE" by requesting the operator to select one of these sublists. For this purpose, keys 35 and 36 have been configured so as to enable this selection to be made.

If a failure is detected and transmitted to the central processing unit 2 via the local network 1, the central processing unit 2 determines the list of tasks to be performed in order to process this failure. To this end, reference links have been defined between the origins of failures and the task lists enabling them to be processed.

The task list referenced by the origin of the failure and its structure are then transmitted to the terminal which will interrupt the list of tasks being performed so as to display the new list to be processed.

Figure 13:
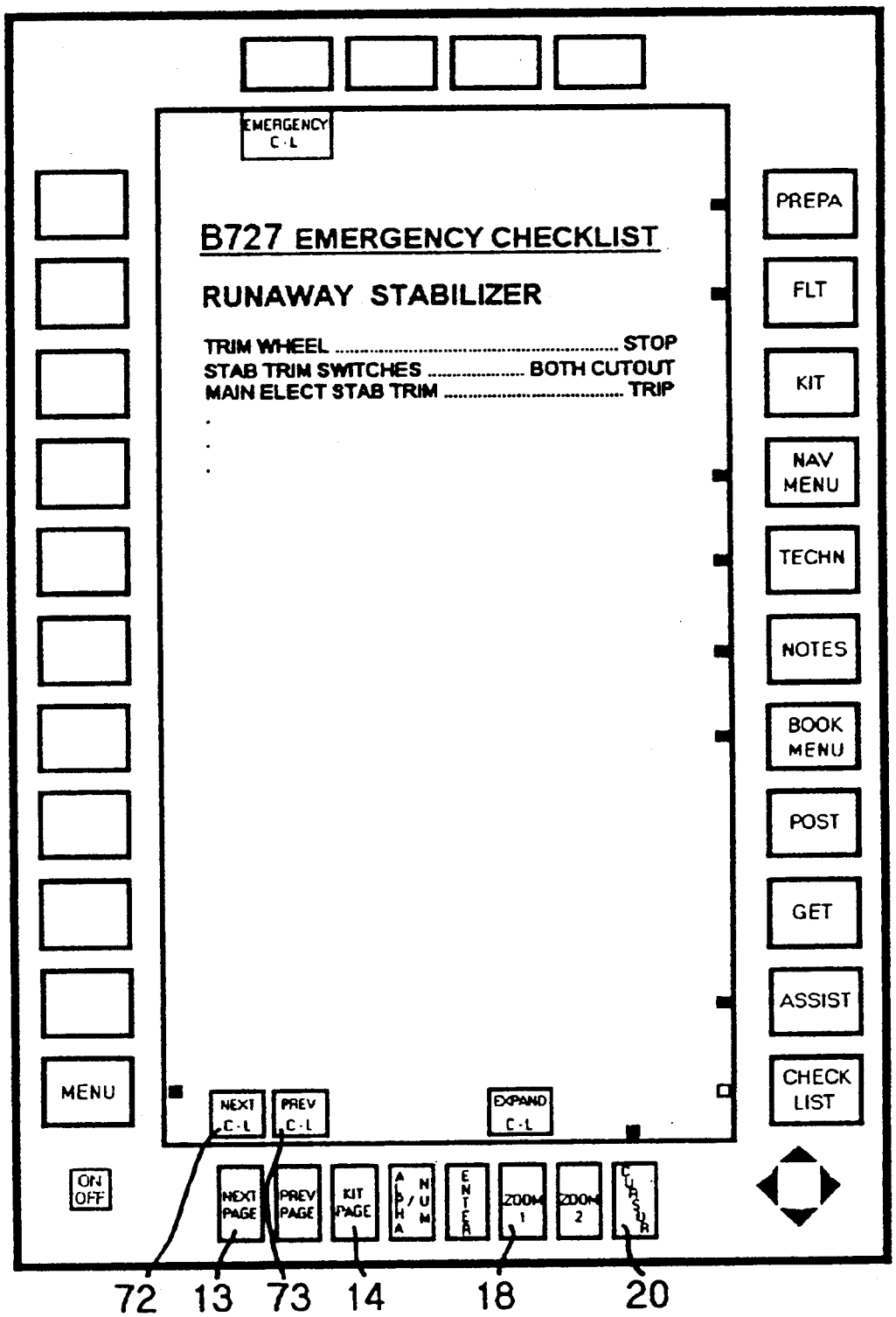

Processing of the "FAST FUEL DUMP" task list is thus launched (FIG. 13) if the failure that occurred required the fuel to be dumped.

We claim:

1. A method for structuring a set of information used in an industrial process, using a terminal comprising a processor, a display screen and a keyboard for introducing commands for displaying graphical symbols on said display screen, and for introducing characteristics associated with said symbols, these graphical symbols being assembled on said display screen in a graph representing an information structure model, said graph comprising at least symbols of a first type representing nodes, and symbols of a second type establishing links between said nodes, said method comprising the steps of:

hierarchical splitting the set of information into subsets having a limited number of different structures and identifying the structure of each of said subsets;

grouping into objects said subsets together by similar structures;

determining characteristics specific to each object;

introducing into said terminal commands for displaying on said display screen a node type symbol for each of said objects, and characteristics of each of said object;

introducing into said terminal commands for displaying on said display screen construction link type symbols each connecting at least two of said node type symbols so as to construct a graph on said display screen, and introducing types and characteristics of said links, each of said links indicating a hierarchical include relation between two objects;

translating by the processor said graph into a structure model of said set of information expressed in a computer language, and detecting by said processor inconsistencies in said model and indicating these inconsistencies on said display screen.

2. The method as claimed in claim 1, further comprising the step of introducing into the terminal of reference link type symbols, each linking two node type symbols to indicate that the corresponding objects refer to one another.

3. The method as claimed in claim 2, wherein a reference link linking a first object to a second object can be of one of the following types:

"node-sons", indicating that it establishes a reference link between said first object and all the objects directly included in said second object, "sons-node", to indicate that it establishes a reference link between all the objects directly included in said first object, and said second object, "sons-sons" to indicate that it establishes a reference link between all the objects directly included in said first object and all the objects directly included in said second object, and "brother-brother" linking a first object to itself to establish reference links between all the objects directly included in said first object.

4. The method as claimed in claim 1, wherein a list of subsets of similar structure is represented by a single node type symbol in a structure model graph.

5. The method as claimed in claim 1, wherein a subset which does not systematically appear in all the information sets structured by a same model, is represented in said graph by an optional object type symbol.

6. The method as claimed in claim 1, wherein a first object of a structure model can be hierarchically linked by construction links to plural second objects so as to form elementary models of the following types:

"alternative", in which just one subset corresponding to said second objects must appear in each set of information structured by this model;

"sequence", in which said second objects always appear in the order indicated on the graph in all the information sets structured by this model; and "aggregate", in which said second objects appear in any order in the information sets structured by this model;

these types of elementary models being combinable in any way whatsoever and being represented on the display screen by node symbols of a third type.

7. The method as claimed in claim 1, wherein the characteristics of an object comprise a type and a default value compatible with said type.

8. The method as claimed in claim 1, further comprising input into said terminal of recursive link type symbols linking a node type symbol of an object to itself to indicate that the structure of said object comprises itself the same object.

9. The method as claimed in claim 1, further comprising monitoring by the processor of validity of each command input into said terminal.

10. The method as claimed in claim 1, further comprising conversion of a structured model expressed in computer language, into a graph drawn up according to the method.

11. The method as claimed in claim 1, further comprising constructing a graph called an instance comprising node type symbols and construction and reference link type symbols between said node type symbols, said graph being obtained by applying a structured model to a given set of information, each of its node type symbols corresponding to a particular subset of said set of information, each of its construction link type symbols establishing an include relation between two subsets, and each of its reference link type symbols enabling a source subset to refer to a destination subset.

12. A method for vehicle piloting assistance, using a set of information comprising a plurality of lists of tasks defining actions and checks to be carried out at each of successive piloting stages, said set being stored in a memory of a computer based on processors taken on board the vehicle, and comprising at least one man/machine communications terminal, said method comprising the steps of:

automatic sequencing on said on-board terminal of processing of said lists of tasks, by means of a first object defining a structure of said set of task lists, said first object being split into second objects, each representing a structure of a task list, said first object defining an order of sequencing of said lists;

automatic sequencing on said on-board terminal of performance of tasks in said list being processed, by means of the second object which defines the structure of said list, said second object being split into third objects representing a structure of said tasks, said second object defining an order of sequencing of performance of said tasks.

13. The method as claimed in claim 12, further comprising automatic triggering on said terminal of performance of an appropriate list of tasks in the event of a failure, by means of fourth objects identifying failures, of the second objects defining a structure of the list of tasks enabling said failures to be processed, and of reference links established between said second and said fourth objects.

14. The method as claimed in claim 12, further comprising viewing, on the screen of said terminal, of comments relating to the task and task list being performed, by means of the third and second objects defining respectively the structure of said tasks and of the task lists, and of fifth objects defining a structure of said comments, as well as reference links established between said third and fifth objects.

15. A terminal designed for generating a structure model of a set of information used for controlling an industrial process, a structure model comprising at least objects each representing subsets of similar structures of said set of information, said objects being linked to each other by hierarchical include relations, said terminal comprising:

a display screen;

a keyboard enabling commands and data to be entered by an operator, said keyboard having at least one first set of function keys respectively assigned to display on said display screen at least two types of graphical symbols representing respectively nodes and construction links between said nodes, and one second set of keys for entering parameters associated to the graphic symbols; and processor having means for scanning the keyboard, means for displaying on the display screen the graphic symbols introduced by means of the keyboard so as to form a graph of an information structure model wherein each node symbol represents an object and each construction link symbol between at least two nodes a hierarchical include relation, means to translate said graph into a structure model expressed in a computer language and reversely, and means to detect inconsistencies in said structure model and to display these inconsistencies on said display screen.

* * * * *